Dec. 12, 1967     T. W. CHASE     3,357,208
SHAFT COUPLING
Filed Feb. 7, 1965
2 Sheets-Sheet 1
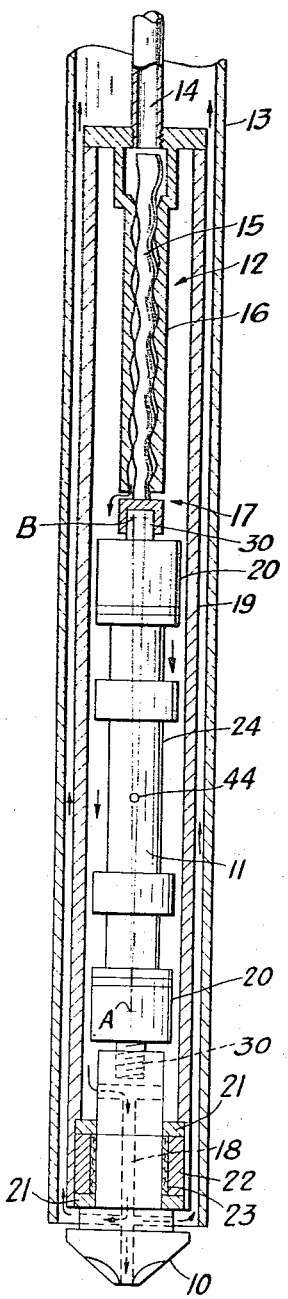
FIG. 1
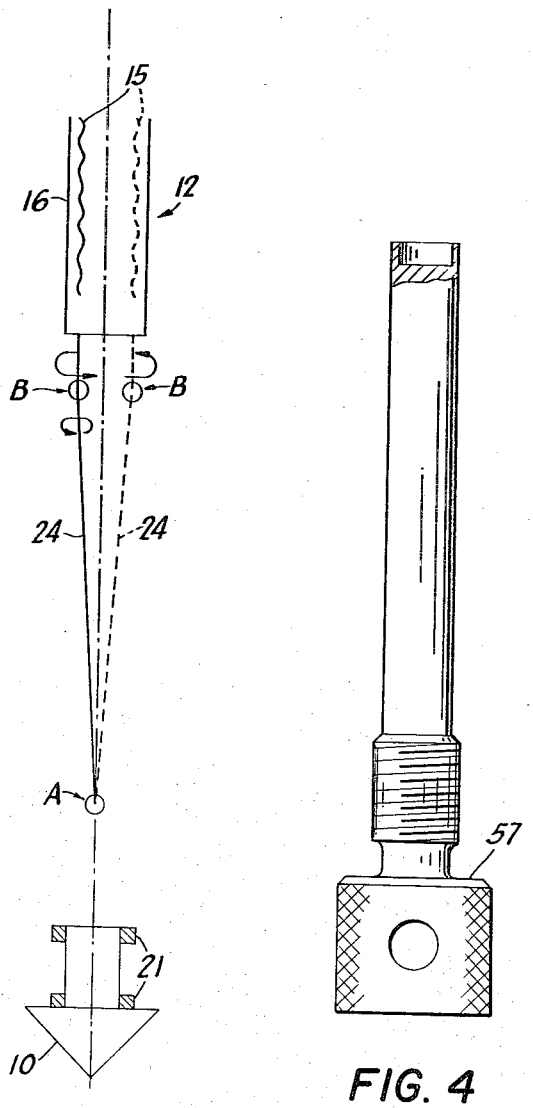
FIG. 3
FIG. 4
INVENTOR.
THEODORE W. CHASE
BY Boyce C. Dent
his Attorney Dec. 12, 1967     T. W. CHASE     3,357,208
SHAFT COUPLING Filed Feb. 7, 1966     2 Sheets-Sheet 2

INVENTOR.
THEODORE W. CHASE
BY *Boyce C. Dent*
his *Attorney*

United States Patent Office 3,357,208
Patented Dec. 12, 1967

3,357,208
SHAFT COUPLING
Theodore W. Chase, Baltimore, Md., assignor to Koppers Company, Inc., a corporation of Delaware
Filed Feb. 7, 1966, Ser. No. 525,546
6 Claims. (Cl. 64—9)

ABSTRACT OF THE DISCLOSURE

A flexible gear-type shaft coupling for an environment of greater than atmospheric pressure having means for maintaining lubricant within the coupling at substantially ambient pressure comprising a shaft having an externally toothed coupling hub secured to each end thereof; a coupling sleeve overlying each hub and having internal teeth adapted for driving engagement with the external teeth and defining a lubricant chamber therein; a resilient sleeve overlying and secured to each end of the shaft and to the coupling sleeve, being adapted to induce ambient pressure acting against the resilient sleeve to the lubricant within the chamber; and, preferably, a pair of axially opposed pistons within the shaft in communication with ambient pressure and the respective lubricant chambers to further induce ambient pressure to the lubricant.

---

This invention relates generally to shaft couplings and more particularly to gear type flexible shaft couplings.

The present invention is concerned with overcoming problems associated with couplings used in environments wherein the exterior of the coupling is exposed to greater than atmospheric pressure, hereinafter referred to as ambient pressure, such as is found in deep well drilling operations. For example, in deep wells the ambient pressure of water and slurry surrounding the drilling head, drive motor, etc. may be of the magnitude of 10,000-15,000 pounds per square inch. Obviously, such pressures react with the drilling machinery and is especially troublesome when the interior of the machinery cannot be exposed to the pressure.

One such application involves the use of a fluid motor to drive a drill bit. Advantageously, the motor is energized by a fluid, usually slurry, forced through it at high pressure. The same slurry is used to lubricate the drilling bit and, when ejected from the motor, surrounds it so that in effect the pressures within and without the motor are substantially at equilibrium, discounting the differential pressure used to drive the motor. An example of this type motor is the Moyno motor made by Robbins and Myers, Inc. and described in their Bulletin No. 30-C dated November 1952.

One characteristic of this fluid motor is that its output shaft does not rotate concentrically but instead rotates eccentrically at speeds up to 1000 revolutions per minute or more. That is, the output shaft not only rotates, but also revolves around a central axis. Thus, the drill bit driven by the motor must be connected by a flexible connection or coupling. Conventionally, the flexible connection is one or more flexible connecting rods such as universal joints. These rods operate in the slurry surrounding the bit and motor and are thus subjected to ambient pressure which makes lubrication all but impossible; the water being forced into the working parts of the rods, destroying any initial lubricant provided. Consequently, the working life of these rods is extremely limited, sometimes being no more than sixty hours. At present, the drill bit far outlasts the rods. Replacing the rods requires that the whole drilling unit be withdrawn from the well, thus requiring the dismantling of numerous sections of conduit which is both time consuming and expensive.

One peculiar phenomenon which has been observed in machinery having sealed in lubricants is that the lubricant seems to disappear as the machinery is operated. No completely satisfactory explanation is known but it is believed that the lubricant may vaporize and be compressed as a gas or it may oxidize and be reduced in volume or perhaps some weeping or leakage occurs. Regardless of the cause, if lubricant does not fill the lubricant cavity, some parts of the machinery may not be adequately lubricated and consequently wear out very quickly.

Accordingly, an object of the present invention is to provide a flexible coupling for connecting an eccentrically rotating member with a substantially concentrically rotating member with means for maintaining the lubricant cavity filled while substantially balancing lubricant pressure and ambient pressure to exclude contaminants, such as slurry, from the lubricated parts of the coupling.

Briefly, the invention contemplates a shaft coupling comprising a spindle and a sleeve. The spindle has external teeth at one end, and this end is surrounded by a sleeve having internal teeth for meshing with the external teeth whereby the meshing of teeth provides a driving relationship between the spindle and the sleeve and a lubricant system is provided for the teeth and includes means for maintaining ambient pressure on the lubricant bathing said teeth and means independent of said ambient pressure for augmenting the pressure on the lubricant.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 1 is a view in partial cross-section showing a drilling assembly comprised of a fluid motor, an embodiment of novel coupling and a drill bit within a well casing;

FIGURE 3 is a schematic illustration showing the translation of eccentric rotary motion to concentric rotary motion by the coupling; and FIGURE 4 illustrates a tool advantageously used to assemble the coupling.

Figure 2:
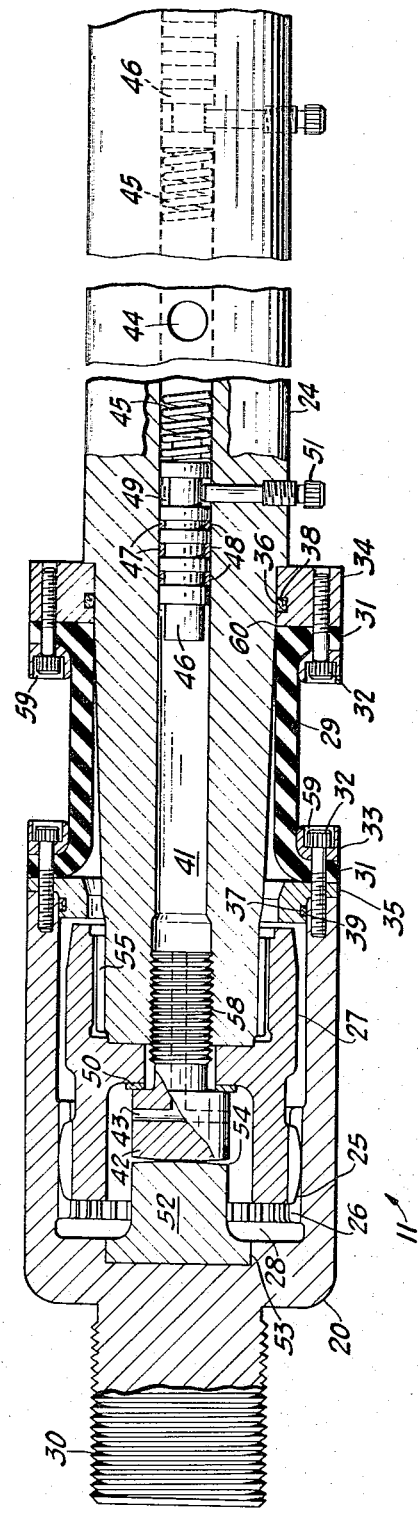
FIGURE 2 is a view in cross-section of the coupling of FIG. 1.

Referring now to FIG. 1, a drill bit 10 is connected through the novel coupling 11 of this invention to a Moyno motor 12 within a well casing 13. Slurry is supplied from the earth's surface under pressure through conduit 14 into the motor 12. As the slurry passes through the stator 16, it forces the rotor 15 to rotate within stator 16. The rotation of the output end 17 of rotor 15 is transferred to drill bit 10 by coupling 11. The slurry escaping from the output end 17 of the motor 12 is contained within housing 19 and thus is directed through cavity 18 in drill bit 10 to its cutting surfaces. Thereafter, the slurry being blocked by earth surrounding the bit 10, flows upwardly in well casing 13 to the surface.

When motor 12 is not being driven, the slurry pressure in conduit 14 is equal to the slurry pressure in well casing 13. Thus, any slight additional pressure applied to the slurry in conduit 14 causes the slurry in casing 13 to flow upwardly, no matter at what depth the assembly is situated below the surface. Consequently, the additional slurry pressure in conduit 14 need be only a magnitude sufficient to drive motor 12. This pressure varies, depending mostly upon the type of soil being drilled, but is usually 200-300 pounds per square inch.

Drill bit 10 is mounted within housing 19 by means of thrust bearings 21. These bearings are spaced apart by a bushing 22 having an elastomeric insert 23. The insert, which may be of rubber, neoprene, or the like, serves to cushion vibratory forces induced by engagement of the drill bit with the soil. In addition, the bushing assembly seals the slurry within housing 19 so that the slurry must flow through cavity 18.

The bit 10 is substantially rigidly and rotatably mounted in housing 19. On the other hand, output rotation 17 of motor 12 is eccentric to the axis of the bit 10. In accordance with this invention, the eccentric rotational force of motor output shaft 17, FIG. 3, occurs at point B and is converted into concentric rotational force at point A through the coupling 11 so that drill bit 10 is concentrically rotated despite the eccentric rotation of motor output shaft 17. This conversion is accomplished by attaching coupling sleeves 20 to the motor rotor 15 and to the bit 10 and connecting the coupling sleeves with a floating spindle shaft 24. To provide a drive connection between sleeves 20 and spindle 24, the sleeves include internal spur gear teeth which mesh with external spur gear teeth on the shaft 24.

It is, of course, necessary to provide lubrication for the meshing gear teeth, and this presents a problem in the present environment where the drill is deep in the well hole and the coupling is surrounded by an ambient pressure of several thousand pounds per square inch. The tendency is for the surrounding slurry to be forced into the coupling to dilute or force the initial lubricant out of the coupling, thereby causing the coupling to wear at an accelerated rate. In accordance with this invention, a novel arrangement is provided for maintaining the lubricant under the same pressure or greater pressure than the pressure of the surrounding slurry. With the pressure of the lubricant being slightly greater or substantially in equilibrium with the slurry pressure, no tendency exists for the slurry to enter the coupling, contaminate the lubricant and destroy lubrication. Additional means are provided to maintain the lubricant under positive pressure regardless of ambient pressure so that should the volume of lubricant bathing the gear be reduced to oxidation or the like, the lubricant will still be forced into a cavity surrounding the coacting load bearing surfaces of the coupling.

Turning now to FIG. 2, the spindle shaft 24 of coupling 11 has crowned external spur gear toothed hubs 27 splined and bolted to each end. The outer coupling sleeves 20 have internal spur gear teeth 26 for meshing with the external teeth 25 of the hubs 27. Suitable thrust elements 42 are mounted in one end of each of the hubs 27 with thrust surfaces lying in a diametral plane bisecting the center of the crown of coupling teeth 25. Male threaded studs 30 at their projecting ends of sleeves attach the sleeves with the fluid motor 12 and drill bit 10 respectively. The sleeves 20 are retained on shaft 24 by suitable retaining rings 35 and the sleeves and shaft are sealed with flexible boots 29.

A cylindrical bore extends axially of shaft 24. Bore 41 contains two opposed pistons 46 which separate by a common helically coiled compression spring 45. Thrust buttons 42 are threaded into each end of bore 41. An aperture 43 in thrust button 42 places bore 41 in communication with lubricant chamber 28. An aperture 44 in shaft 24 between pistons 46 places bore 41 in communication with the exterior of the coupling. The piston 46 under the urging of spring 45 maintains the lubrication around gear teeth 25 and 26 under pressure. Bore 41 is vented to the slurry in housing 19 by a hole 44 in shaft 24 between the opposed pistons 46. Thus, gear tooth lubricant, in the chambers 28 between the pistons 46 and the boots 29 is held under pressure by ambient pressure on the boots 29 and on the facing ends of the pistons 46, and this pressure is augmented by differential pressure exerted by the compression spring 45, thereby maintaining the lubricant pressure on the meshing teeth at a value greater than the ambient pressure of the slurry surrounding the coupling 11.

To seal the shaft 24 and sleeves 20, a flanged boot 29 preferably fabricated from neoprene rubber or the like with a webbing material molded therein for added strength is provided. One flanged end portion 31 of boot 29 is secured to shaft 24 by bolts 32 passing through a retaining ring 33 and resting on the boot and threaded into a retaining ring 34 on shaft 24. The opposite flange portion 31 is secured in the same manner to retaining ring 35 on sleeve 20. Retaining rings 34, 35 are separable from shaft 24 and sleeve 20, therefore, O-rings 36, 37 may be placed in suitable grooves 38, 39 to insure fluid tightness of the assembly. The sleeve, shaft, and hub assembly is identical on both ends of the coupling.

Pistons 46 are provided with annular grooves 47 in which are placed radially split seal rings 48 to effect a fluid tight seal between the pistons 46 and the wall of the bore 41. These seal rings are preferably made of polytetrafluoroethylene although they may be made of any conventional sealing material. Alternate rings may be of different materials if preferred. Annular groove 49 in piston 46 accommodates a screw 51 threaded into shaft 24. Screw 51 locks piston 46 in place before lubricant is added to the assembly as will be later explained. After lubricant is added, both screws 51 are removed and replaced by short closure screws thereby permitting the pistons 46 to be biased against the lubricant by the spring 45. In this manner, the lubricant is always maintained under compressive force independent of ambient pressure even though the volume of the lubricant may decrease.

When placed in its working environment, the slurry surrounding the coupling is vented through aperture 44 into central bore 41 and against the pistons 46. Thus, the ambient pressure, of whatever magnitude, is induced in the lubricant so that the internal and external pressures are substantially equal. Since there is an additional pressure induced in the lubricant by spring 45, the internal pressure always slightly exceeds ambient pressure. Consequently, there is no tendency for the slurry to enter the working parts of the coupling around the boot 29 or past seal rings 48. Since the internal and external pressures are in substantial equilibrium, the boot 29 will be almost unaffected by ambient or lubricant pressure.

Thrust forces are usually induced in the coupling by the rotor 15 and the drill bit 10 reacting with the soil. To absorb these forces, two opposed thrust buttons 42, 52 are provided at each end of the coupling; shaft button 42 being threaded into central bore 41 of shaft 24 and also acting as a fastening means to secure hub 27 to shaft 24. Sleeve button 52 is fastened to the sleeve 20 by a press-fit in bore 53 provided in sleeve 20. A lockwasher 50 is provided between button 42 and shaft 24 to prevent the button from vibrating loose. The buttons 42, 52 have opposed equally curved surfaces 54 which meet at a diametral plane bisecting the center of the crown of external teeth 25. The curvature of surfaces 54 is such that their contact point remain within the outer diameter of the buttons when hubs 27 and sleeves 20 are angularly misaligned at the design maximum, taking into account the surface deformation of the contact surfaces caused by the thrust forces imposed.

Although central shaft 24 could be of unitary construction, it is economically attractive to make hubs 27 separate from shaft 24 and secure them to the shaft 24 by means of interlocking splines 55 made in the shaft and hubs.

Advantageously, the coupling 11 is assembled in the following manner. First, seal rings 48 are inserted in grooves 47 of pistons 46 in the known manner. Then, pistons 46 are placed in bore 41, separated by spring 45. This is easily accomplished by first threading assembly tool 57 into threads 58 provided in bore 41. One of the pistons 46 is inserted in the opposite end of bore 41 and urged into contact with assembly tool 57. Groove 49 is automatically aligned with screw 51 which is tightened to retain piston 46 in position. Tool 57 is then removed.

Spring 45 is inserted in bore 41. The other piston 46 is placed in bore 41 next to the spring 45. Tool 57 is threaded into threads 58 thereby compressing spring 45 through piston 46. The other screw 51 is tightened into groove 49 which is in automatic alignment. Tool 57 is then removed.

Retaining ring 34, with O-rings 36 placed in grooves 38, are then pressed on both ends of shaft 24 in the conventional manner. Retaining rings 33 are placed on boots 29 with the counterbore 59 facing each other as shown in FIGURE 2. Boots 29 are then placed around shaft 24 and secured to rings 34 by screws 32 passing through rings 33 and flanges 31 and threaded into the holes provided in rings 34. The internal sharp corner 60 provided on boot 29 is placed adjacent ring 34.

Rings 35, with O-rings 37 placed in grooves 39, are placed around shaft 24 adjacent boot flanges 31. Hubs 27 are then assembled to shaft 24 by sliding the interlocking splines 55 together. Hubs 27 are retained by threading thrust buttons 42 into threads 58 of bore 41 with lockwasher 50 placed between hubs 27 and buttons 42.

Thrust buttons 52 are pressed into counterbores 53 of sleeves 20 in the conventional manner.

The partially assembled shaft 24 is then completely immersed in a tank of lubricant. Squeezing of boots 29 will insure the removal of air from cavity 28. One of sleeve assemblies 20 is then immersed and secured to shaft 24 by sliding teeth 25, 26 into mesh, thereafter threading screws 32 into the holes provided in sleeve 20 through boot flange 31 and ring 35. This procedure is repeated for the opposite end of the shaft. Thus, lubricant chamber 28 is completely filled with lubricant, no air being present.

The completed assembly of coupling 11 is removed from the lubricant tank and the lubricant allowed to drain through vent 44 from the portion of bore 41 between the pistons 46. Thereafter, screws 51 are removed, releasing pistons 46 which are then automatically biased against the lubricant in both chambers 28 by spring 45.

The assembled coupling 11 may then be connected to the motor 12 by threading one of the male studs 30 into a female socket provided at the output 17 of motor 12 and secured in the conventional manner. Likewise, the opposite male stud 30 is threaded into a female socket provided in the drill bit 10 and secured in the conventional manner. The complete drilling assembly can then be placed in casing 13 and used as will be well understood by those skilled in the art.

The foregoing description has been directed towards an application wherein the ambient pressure is greater than atmospheric. However, it is evident that the coupling would work equally well where the ambient pressure is less than atmospheric, as for example, in space vehicles. In this case, the only substantial pressure on the lubricant would be that imposed by spring 45, which pressure could be varied by design. Thus, pressure could be maintained in the lubricant to insure adequate lubrication of working parts.

The coupling can be advantageously used in mediums where it is essential that the lubricant be separated from the surrounding fluid, as for example, in pumping liquid or semi-liquid foods or chemicals. In this case, it might be advantageous to substitute a diaphragm, such as a bellows, for the piston 46. One skilled in the art could readily adapt the foregoing principles to effect such a change.

Although the gear type coupling described herein is preferred, other variations may be employed without departing from the scope of the invention. For example, the teachings herein may be easily adapted to constant velocity universal joints. In other applications, only single engagement couplings or joints may be required rather than the double engagement element coupling herein illustrated.

Having thus described my invention in its best embodiment and mode of operation, what I desire to claim by Letters Patent is:

1. A coupling for connecting an eccentrically rotating shaft to a concentrically rotating shaft comprising:
   a sleeve adapted to be attached to said eccentrically rotating shaft;
   a sleeve adapted to be attached to said concentrically rotating shaft;
   each of said sleeves having internal gear teeth therein;
   a spindle having external gear teeth at its ends for engagement with a respective sleeve;
   means surrounding said spindle for sealing the juncture of said spindle and sleeves from external environment;
   said spindle having an opening extending axially therethrough;
   a pair of freely movable opposed pistons in said opening;
   an aperture extending transversely of said opening and located between said pistons whereby ambient pressure acts through said opening on said pistons to bias said pistons apart;
   a lubricant between said pistons and said teeth whereby movement of said pistons exerts a pressure on said lubricant; and
   means for additionally biasing said pistons apart including compression spring abutting both of said pistons.

2. A flexible coupling for connecting driving and driven elements comprising:
   a shaft having external gear teeth at one end and a hollow portion therein;
   a sleeve surrounding said one end and having internal teeth adapted for driving engagement with the external teeth of said shaft and defining an interior chamber therewith;
   retaining means for retaining lubricant within said interior chamber and in communication with said interior chamber and with the exterior of said coupling and including
   a flexible element in fluid tight connection with said shaft and said sleeve; and
   a piston slidably disposed within said hollow portion of said shaft
   whereby said flexible element and said piston are urged against said lubricant by ambient pressure surrounding said coupling to induce substantially ambient pressure in said lubricant.

3. The coupling of claim 2, and in addition:
   a first arcuate surface on said shaft; and
   a second arcuate surface on said sleeve axially coacting with said first surface for absorbing thrust forces imposed on said coupling by said driving and driven elements.

4. The coupling of claim 2, and in addition:
   a resilient element disposed within said hollow portion adapted to bias a portion of said retaining means against said lubricant,
   whereby said lubricant is maintained under a compressive force independent of forces imposed by ambient pressure.

5. A flexible coupling for connecting driving and driven elements, comprising:
   a shaft having a hollow portion therein;
   a first sleeve adapted for driving engagement with one end of said shaft and defining a first interior chamber therewith;
   a second sleeve adapted for driving engagement with the opposite end of said shaft and defining a second interior chamber therewith;
   retaining means for retaining lubricant within said interior chambers and in communication with said interior chambers and with the exterior of said coupling;

said retaining means being responsive to ambient pressure to induce substantially ambient pressure in said lubricant, said retaining means including, a first flexible element in fluid tight connection with one end of said shaft and said first sleeve;

a second flexible element in fluid tight connection with the opposite end of said shaft and said second sleeve;

a first piston slidably disposed within said hollow portion of said shaft in sealing engagement therewith, said hollow portion communicating with said first and second interior chambers;

a second piston slidably disposed within said hollow portion in sealing engagement therewith and spaced from said first piston;

a resilient element disposed within said hollow portion adapted to bias said first and second pistons against said lubricant in said first and second interior chambers respectively; and, first arcuate surfaces on opposite ends of said shaft, and second arcuate surfaces on said first and second sleeves axially co-acting with said first surfaces to absorb thrust forces imposed on the ends of said sleeves.

6. A flexible coupling for connecting driving and driven elements, comprising:

a shaft connected to one of said elements and having an externally toothed hub portion at one end thereof;

a sleeve portion connected to the other of said elements and surrounding said hub portion and having an internally toothed portion adapted for driving engagement with said externally toothed hub portion and defining an interior lubricant chamber therewith;

said sleeve portion having a first end portion closing said chamber adjacent the outermost end of said hub portion and a second end portion extending beyond said hub portion along said shaft;

said shaft having a radial flange portion spaced from said sleeve second end portion and an axially tapered portion extending from said radial flange portion to said hub portion; and a flexible element having an annular wall portion of smaller diameter than said sleeve portion and surrounding said shaft tapered portion thereby defining a tapered cavity with said interior chamber;

said flexible element having radial end portions adapted for fluid tight connection with said shaft radial flange portion and said sleeve second end portion respectively for retaining lubricant within said interior chamber;

said flexible element providing a resilient surface for said interior chamber in communication with and responsive to ambient fluid pressure surrounding said coupling to induce substantially ambient pressure in said lubricant.

References Cited

UNITED STATES PATENTS

| | | | |
|---|---|---|---|
| 2,085,986 | 7/1937 | Levier. | |
| 2,130,583 | 9/1938 | Fosnot | 184—39 |
| 2,236,887 | 4/1941 | Arutunoff | 184—41 X |
| 2,301,340 | 11/1942 | Spengler | 184—41 X |
| 2,867,100 | 1/1959 | Beecher | 64—9 |

HALL C. COE, *Primary Examiner.*